C. Wheeler, Jr.
Mower.
No. 41,559.  Patented Feb. 9, 1864.
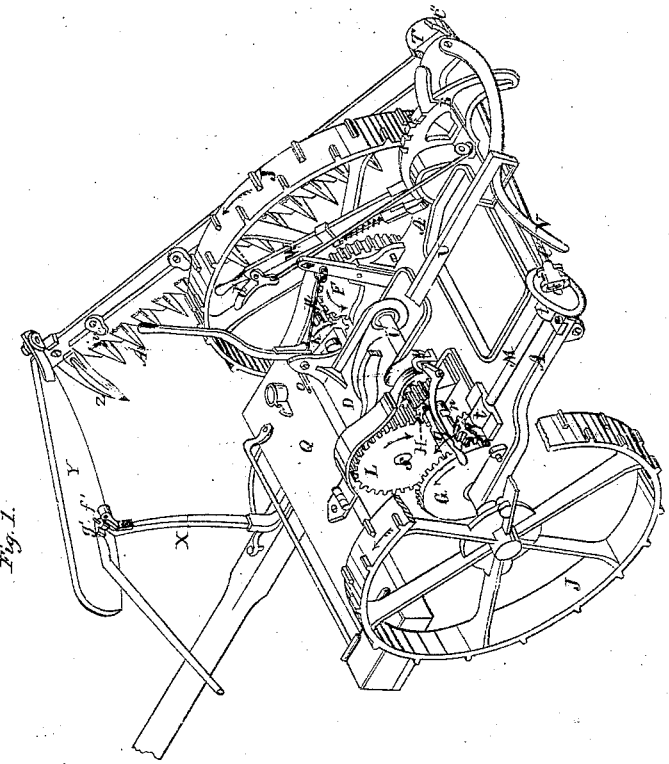
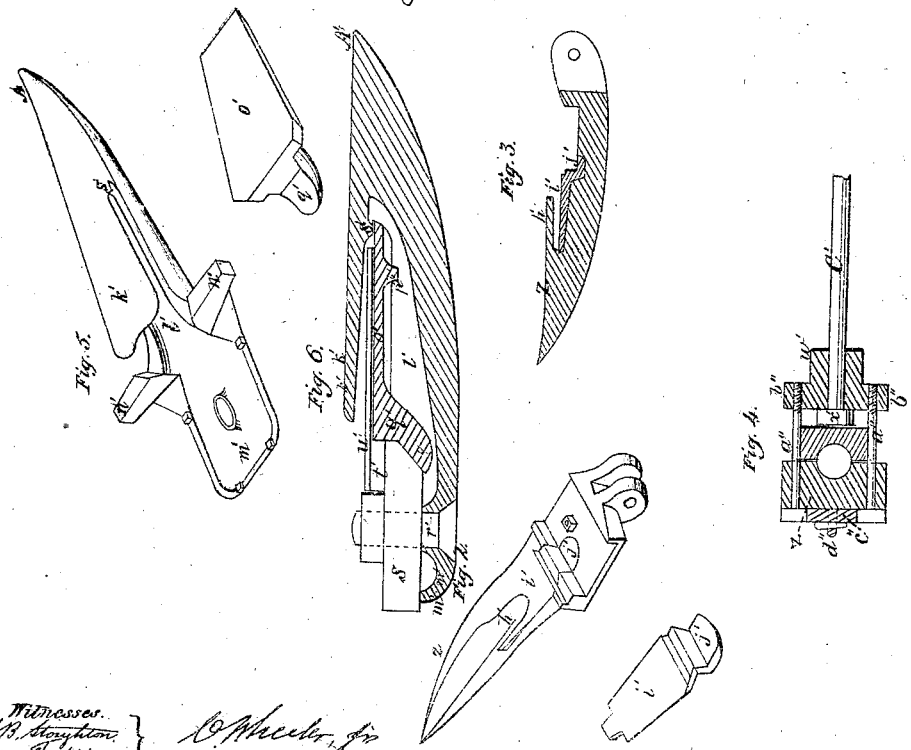
Witnesses.  C. Wheeler, Jr.

UNITED STATES PATENT OFFICE.

CYRENUS WHEELER, JR., OF POPLAR RIDGE, NEW YORK.

IMPROVEMENT IN HARVESTING-MACHINES.

Specification forming part of Letters Patent No. 41,559, dated February 9, 1864.

*To all whom it may concern:*

Be it known that I, CYRENUS WHEELER, Jr., of Poplar Ridge, in the county of Cayuga and State of New York, have invented certain new and useful Improvements in Harvesting-Machines; and I do hereby declare the following to be a full, clear, and exact description of the same, reference being had to the accompanying drawings, making a part of this specification, in which—

Figure 1 represents in perspective the machine with the finger-bar and cutting apparatus "folded up" and ready for transportation to or from the field. Fig. 2 represents in perspective the outside divider and its ledger-plate, both in place and detached therefrom. Fig. 3 represents a longitudinal vertical section through the outside divider and its ledger-plate. Fig. 4 represents a section through the pitman-connection. Fig. 5 represents a perspective view of one of the guards and its ledger-plate detached. Fig. 6 represents a longitudinal vertical section through one of the guards, showing the ledger-plate in place.

Similar letters of reference, where they occur in the separate figures, denote like parts in all cases.

The nature of this invention consists, first, in providing a standard upon the tongue of the machine for supporting and holding the cutting apparatus when folded up for transportation.

It further consists in the combination of a ledger-plate with a shoe having a support both above and below the cutter for the grass or grain.

It further consists in a guard-finger having a support for the grass or grain both above and below the cutter, and a ledger-plate locking with it, in connection with a cutter, the bar of which is on its under side, and placed over the finger-bar; and it further consists in the combination and arrangement, in connection with the cutting apparatus, of the several parts composing the swivel-connections of the pitman and crank that operate the cutters.

To enable others skilled in the art to make and use this part of my invention, I will proceed to describe the same with reference to the drawings, which show the entire machine; but I shall only refer specifically to such parts thereof as pertain more particularly to the features claimed, the other portions being fully described in other divisions of the invention, for which other applications for patents accompany this one, and wherein they are described and claimed.

When it is desired to fold up the cutting apparatus, as shown in Fig. 1, it is first raised from the ground by the lifting devices U V. The outer end of the finger-bar is then raised into a vertical position, when by means of the thumb-lever $d'$ the bolt $e'$ can be thrown out of the notches of the quadrant B, and the cutting apparatus will then turn down outside of the drive-wheel, and the graduating-lever W on the inside of the wheel. To fasten the cutting apparatus when thus folded up, and to prevent it from swinging outward from or inward against the driving-wheel J, a standard, X, is provided and fastened to the top of the tongue, having a prong, $f'$, over which is slipped the loop $g'$ of the track-board Y.

The shoe Z has a cap or upper portion, $h'$, for supporting the crop, as it is acted upon by the cutter, and to enable it to accomplish the work more effectually a recess is formed in the body of the shoe below the cap for the reception of the ledger-plate $i'$. The ledger-plate has a shank, $j'$, which locks under the finger-bar where the shoe is bolted to it. The front end of the ledger-plate is fastened by inserting it in a cavity formed at the end of the slot of the shoe, as seen at Fig. 3. The inside of the ledger-plate is beveled under, so as to form a sharp corner on its upper side, and when inserted in the shoe overhangs the body of the shoe below it like a ledge. The ledger-plate can be easily removed, sharpened, and replaced at pleasure.

The guard-fingers A' are formed with an upper part or cap-piece, $k'$, to support the crop when acted upon by the cutters. The bodies of the guards below the caps have grooves $l'$ extending from their heels $m'$ forward under the points of intersection of the cap-pieces $k'$ with the bodies of the guards. On either side of each guard, in front of its heel $m'$, are bars $n'$, which are raised above the body of the guard a distance equal to the thickness of the ledger-plate $o'$. This ledger-plate is wider at the rear than at its front end, and wider than the body of the guard below it, and is chamfered at both edges, so as to make an acute angle with the upper surface of the guard. On the under side, near its front end, it has a rib, $p'$, equal in length to the width of the groove in the body of the guard where it is inserted. The rear end of the plate has a shank, $q'$, formed with it or riveted to it, that projects downward and back from it, so that when inserted in place it will, when the plate is fixed in its position in the guard, lock under the finger-bar and be held fast by the bolt $r'$, that secures the guard to the finger-bar S. The plate is inserted in the guard by sliding it under the cap $k'$ and depressing its point, so as to pass it under the lip or ledge $s'$, when the rear end of the plate will drop in between the bars $n'$, which will hold it from lateral or backward movements. The back parts of the bars $n'$ rest against the front edge of the finger-bar S, and are enough higher than the upper surface of the finger-bar to give room for the knife-rod $t'$ between it and the cutter $u'$. The cutter $u'$ is fastened at its heel to the top of the knife-rod, which rests on the finger-bar S, and when in its position the front or cutting part of the knives or cutters projecting forward of the bars $n'$ and working over the ledger-plates, the cutters being kept down by the clips $v'$. By removing the bolt $r'$ the ledger-plate can be removed and sharpened at pleasure, or a new one inserted.

C is the pitman, passing through a swivel-piece, $w'$, and having a head, $x'$, which abuts against the crank-box $y'$. The other box, $z$, has holes at each end, through which the bolts $a''$ pass and screw into the ears $b''$ of the swivel-piece. The bolts have square heads, which are kept from turning by a plate, $c''$, slipping over a projection, $d''$, of the box $z'$, in which it is fastened by inserting a pin in a hole prepared for that purpose.

Having thus fully described this part of my invention, what I claim therein, and desire to secure by Letters Patent, is—

1. In combination with the track-board, the standard on the tongue as a fastening for the cutting apparatus when folded up, substantially as described.

2. In combination with a shoe which has a support for the grass or grain both above and below the cutter, the ledger-plate connected with it, and held firmly in place by the finger-bar, substantially as described.

3. In combination with a guard-finger having a support for the grass or grain, both above and below the cutter, the ledger-plate locking with it, as described, (said ledger-plate having a shank so arranged that it will lock under the edge of the finger-bar when the guard-finger is in place, and the bolt fastening it to the finger-bar holds both the guard and the ledger-plate in position,) a cutter, the bar of which is on its under side and is placed over the finger-bar, substantially as described.

4. In combination with the cutting apparatus, the arrangement of the several parts composing the swivel-connections of the pitman and crank for operating said cutting apparatus, substantially as described.

C. WHEELER, JR.

Witnesses:
    A. B. STOUGHTON,
    XAVER FENDRICH.